United States Patent [19]

Borkan

[11] 4,160,376

[45] Jul. 10, 1979

[54] METHOD AND DEVICE FOR ESTIMATING FUEL CONSUMPTION

[76] Inventor: William N. Borkan, 3031 Prairie Ave., Miami Beach, Fla. 33140

[21] Appl. No.: 803,101

[22] Filed: Jun. 3, 1977

[51] Int. Cl.² .............................................. G01F 9/00
[52] U.S. Cl. ...................................... 73/113; 73/114
[58] Field of Search .................................. 73/114, 113

[56] References Cited

U.S. PATENT DOCUMENTS

| 3,812,710 | 5/1974 | Bauman et al. | 73/114 |
| 4,026,146 | 5/1977 | Kuno et al. | 73/113 |

OTHER PUBLICATIONS

E. F. Obert, *Internal Combustion Engines*, pp. 4-5 and 382-426 (1968).
Heyer Industries, "Dyna-Vision Instruction Manual," pp. 23-24.

*Primary Examiner*—Anthony V. Ciarlante
*Attorney, Agent, or Firm*—Leitner, Palan, Martin & Bernstein

[57] ABSTRACT

Fuel consumption is estimated by counting the number of cycles of operation of the cylinders of an internal combustion engine and multiplying by a constant representing the fuel consumed for each cycle. Rate of consumption is measured relative to time and distance. The cycles are counted by sensing the ignition spark or revolution of the distributor rotor.

16 Claims, 4 Drawing Figures

METHOD AND DEVICE FOR ESTIMATING FUEL CONSUMPTION

BACKGROUND OF THE INVENTION

The present invention relates generally to fuel consumption devices and more specifically to a new method and apparatus for measuring fuel consumption and to calculate fuel consumption rate.

Fuel consumption meters generally include a device to measure the flow of fuel from the carburetor to the internal combustion engine and calculate the miles per gallon using an indication of distance travelled. The expense of these devices has been fairly substantial and has prevented their introduction into the market because of the sophistication needed to monitor the fuel flow rate. With the introduction of electronic fuel injection, an accurate measure of fuel being consumed is a direct relationship to the electronic signal which drives the fuel injectors as exemplified by U.S. Pat. No. 4,002,062. Generally, the width of the pulse which activates the fuel injector has a direct relationship to the amount of fuel being dispensed.

Thus there exists a need for an inexpensive device to measure fuel flow rate, other than direct measuring with expensive flow meters, and that might be used with engines that do not have electronic fuel injection. U.S. Pat. No. 3,812,710 illustrates one approach to indirect measurement and the present invention another.

SUMMARY OF THE INVENTION

The present apparatus and method provide an indirect, inexpensive technique of estimating fuel consumption by monitoring the number of cycles of operation of the cylinders of an internal combustion engine and multiplying times a constant representing the amount of fuel consumed in each cycle of a cylinder to produce a total fuel consumption value. This consumption value may be measured over a fixed period of time to provide fuel consumption per unit time or may be measured for a fixed amount of distance to provide consumption as a function of distance. The number of cycles of operation of the cylinders can be sensed or determined by an induction coil which monitors the electric ignition pulses used to ignite the spark plugs in the individual cylinders. Similarly, the rotation of the distributor may be monitored to provide an indication of the number of cylinders fired. Means are provided to adjust the constant used to multiply times the number of cycles of operation of the cylinders for the various types of engines and carburization systems used in combination or in response to other engine operating parameters automatically.

OBJECTS OF THE INVENTION

An object of the present invention is to provide an inexpensive method of estimating fuel flow in internal combustion engines.

Another object is to provide an inexpensive method of estimating miles per gallon and displaying the same.

Further object of the invention is to provide an inexpensive method and apparatus for estimating fuel consumption without directly measuring the exact fuel flow.

Still a further object of the present invention is to provide an inexpensive fuel consumption device which is readily installed into existing motor vehicles.

Other objects, advantages, and novel features of the present invention will become apparent from the following detailed description of the invention when considered in conjunction with the accompanying drawings.

DESCRIPTION OF THE PREFERRED EMBODIMENTS

The method and apparatus of the present invention are predicated on the concept that the amount of fuel delivered to each cylinder of any particular internal combustion engine is fairly constant. This is true even though the amount of mixture reaching each cylinder is not constant, since the mixture of air and fuel varies so that the actual amount of delivered fuel is constant. Thus a technique can be developed which can take advantage of this concept by counting the number of cycles of operation of the cylinders and multiplying by a constant representing the amount of fuel used in each cycle of a cylinder. The present method is applicable to an internal combustion engine, be it two stroke or four stroke, reciprocating or rotary piston.

Figure 1:
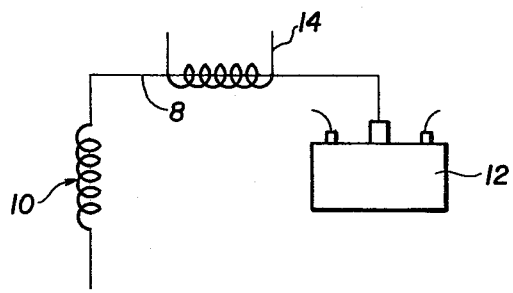
FIG. 1 is a schematic representation of a device for monitoring the ignition pulses for spark plugs.

A readily accessible means for monitoring the number of cycles of operation of the cylinders is to monitor or count the high voltage pulses going to the spark plugs. The pulses may be taken from a wire 8 leading from the ignition coil 10 to the distributor 12. These signals may be conveniently obtained by an induction coil 14 as illustrated in FIG. 1. Although the inductive pickup 14 is illustrated on the wire 8, any other transducer means may be used, as well as detection at any other point of the ignition system, to provide an indication of the number of cycles of operation of the cylinders in an internal combustion engine.

Figure 2:
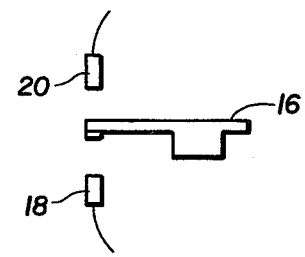
FIG. 2 is a schematic representation of the device for monitoring the rotation of a distributor rotor.

Another means or method of monitoring the number of cycles of cylinder operation is to monitor the number of rotations of the distributor rotor. FIG. 2 illustrates a distributor rotor 16 whose rotation is monitored by a photocell 18 in cooperation with a light source 20. In electronic ignitions, opaque rotor discs are used and thus optical detection is readily available in these systems.

To make the actual calculation of fuel consumption per unit distance, the number of cycles of cylinder operation over a given period of time are counted and multiplied by a constant equivalent to a calculated amount of fuel used in each cylinder cycle. The distance traversed by the vehicle in the same period of time is also measured. The simple calculation of fuel consumption per unit distance is performed by dividing the distance per unit time by the fuel consumption per unit time.

Figure 3:
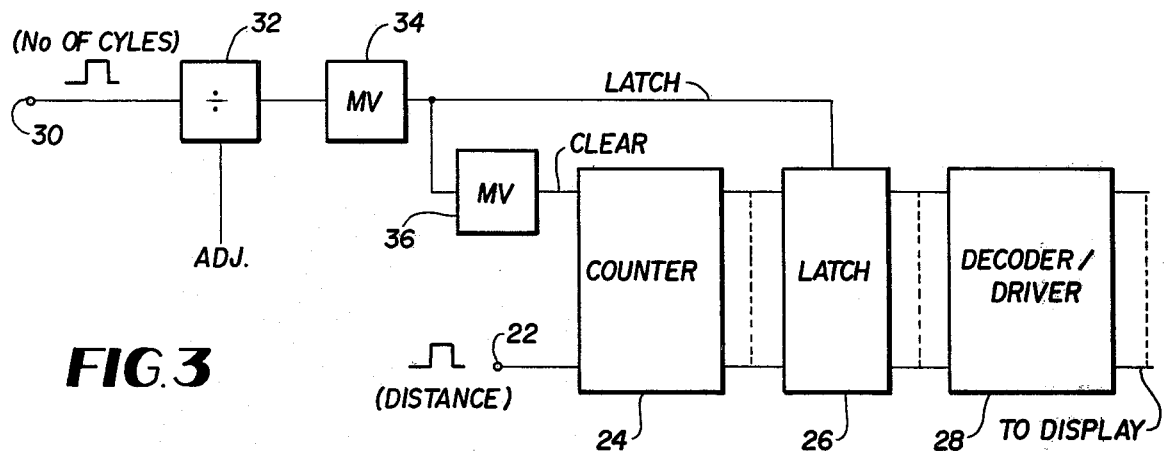
FIG. 3 is a block diagram of a device incorporating the method of the present invention.

Implementation of this concept is illustrated in FIG. 3. Pulses representing distance are provided at input 22 of counter 24. These distance pulses can be obtained from the miles per hour gauge by attaching an optical transducer to the speedometer cable. Each pulse received from the transducer represents a fixed traversed distance. The output of the counter 24 is the input to latch 26 which is further connected to decoder and display driver 28.

A second input 30 to the circuit receives the pulses representing the number of cycles of operation of the cylinders. As indicated previously, this may be derived by counting the high voltage pulses going to the spark plugs by an induction pick or by an optical transducer measuring the rotation of the distributor rotor. Pulses at input 30 are connected to divider 32 which is adjustable. For different models of engines and carburetors, divider 32 is adjusted to provide the appropriate constant representing the amount of fuel used in each cylinder cycle. Divider 32 could also respond to changes in engine operating parameters automatically, such as speed, temperature, and vacuum to obtain more accurate data. It could be connected to a microprocessor if available in the vehicle and be continuously adjusted to provide an extremely accurate output responding to a variety of vehicle conditions. The output of divider 32 drives a single shot multivibrator 34 whose output updates latch 26 with the contents from counter 24. The output of multivibrator 34 also triggers multivibrator 36 which clears the distance counter 24.

Figure 4:
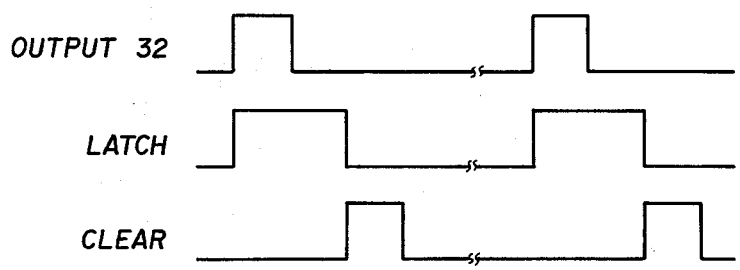
FIG. 4 is a graph of wave forms showing the time relationship of the controls of the circuit of FIG. 3.

An illustration of the time relationship between the latch update and clear output of multivibrators 34 and 36 and the output of divider 32 is illustrated in FIG. 4. It can plainly be seen that the latch update precedes the clearing of the counter 24.

Although two single shot multivibrators 34 and 36 are illustrated for effectuating the latch and clear function, any other electronic device may be used to effectuate this end.

Also, the embodiment of FIG. 3 uses the fuel consumption or the number of cycles of operation of the cylinder times the constant as the clock or the time period of measurement to reset the variable distance counter, the reverse relationship could also be used. Namely, the distance counter may be used to define the time and the number of pulses from the cylinder firings would provide the variable output. Similarly, a common clock may be used such that a counter for the distance and a counter for the fuel consumption may be stopped at a fixed period of time and a calculation or division be performed by other electronic devices. The essence of the present invention is not the specific circuitry of FIG. 3, but the method of calculating or measuring the fuel consumption portion of a miles per gallon meter.

It should also be noted that the miles per gallon computation can be made for short or long periods of time by dividing both the distance and fuel consumption pulse trains by the same constant. This lengthening can be done almost indefinitely without any loss of accuracy.

From the preceding description of the preferred embodiments, it is evident that the objects of the invention are obtained in that an inexpensive fuel flow calculation method and device is provided which can be used with fuel consumption meters. It is also obvious that this concept can be coupled with computer technology to provide a very accurate and inexpensive means of fuel consumption measurement. Although the invention has been described and illustrated in detail, it is to be clearly understood that the same is by way of illustration and example only and is not to be taken by way of limitaton. Multiplying by a constant is equivalent to dividing by a constant since multiplication by the reciprocal of equivalent to dividing. The spirit and scope of this invention is to be limited only by the terms of the appended claims.

What is claimed:

1. In a fuel consumption estimating and indicating device including means for generating a first signal representing distance traversed by a vehicle, means for generating a second signal representing fuel consumed, and means responsive to said first and second signal for generating a third signal representing distance traversed per volume of fuel, the improvement being said second signal means which comprises:
   means for sensing the number of cycles of operation of the cylinders of the vehicle's engine; and
   means for modifying said sensed number by a constant representing an estimate of fuel delivered to a cylinder to generate said second signal.

2. The fuel consumption device according to claim 1 wherein said sensing means includes means for detecting the pulses igniting the spark plugs of said cylinders.

3. The fuel consumption device according to claim 1 wherein said sensing means includes means for detecting revolutions of the distributor rotor.

4. The fuel consumption device according to claim 1 wherein said modifying means includes means for adjusting said constant.

5. A fuel consumption estimating device for non fuel injection engines comprising:
   means for counting the number of cycles of operation of the cylinders of an internal combustion engine; and
   means for multiplying the count by a selected constant representing an estimate of the fuel consumed by each cylinder to generate a signal representing fuel consumption.

6. The fuel consumption estimating device according to claim 5 including means for sensing a cycle of operation of each cylinder.

7. The fuel consumption estimating device according to claim 6 wherein said sensing means includes means for detecting the pulses igniting the spark plugs for the cylinders.

8. The fuel consumption estimating device according to claim 6 wherein said sensing means includes means for detecting revolutions of the distributor rotor.

9. The fuel consumption estimating device according to claim 5 wherein said multiplying means includes means for adjusting said constant.

10. A method for estimating fuel consumption of an internal combustion engine comprising:
    counting the number of cycles of operation of the cylinders of said engine; and
    multiplying the count by a constant representing an estimate of the fuel consumed by each cycle of a cylinder to provide fuel consumption.

11. The method according to claim 10 wherein said counting is performed for a period of time to provide a rate of consumption per unit of time.

12. The method according to claim 11 when said counting is performed for an amount of distance travelled by a vehicle propelled by said engine to provide a rate of consumption per unit of distance.

13. The method according to claim 10 wherein said count is obtained by counting the number of ignition pulses for the spark plugs.

14. The method according to claim 10 wherein said counting is obtained by counting the number of revolutions of the distributor.

15. The method according to claim 10 including the step of selecting said constant as a function of engine operating parameters.

16. The method according to claim 15 including the step of adjusting said constant in response to changes in vehicle operating or environmental parameters.

* * * * *